United States Patent
Parrish

(10) Patent No.: US 9,084,963 B2
(45) Date of Patent: Jul. 21, 2015

(54) MICROENCAPSULATED IMMOBILIZED LIQUID MEMBRANE FOR CARBON DIOXIDE CAPTURE AND ASSOCIATED METHODS

(71) Applicant: Triext, LLC, Cocoa, FL (US)

(72) Inventor: Clyde F. Parrish, Trinity, FL (US)

(73) Assignee: Triext, LLC, Cocoa Beach, FL (US)

( * ) Notice: Subject to any disclaimer, the term of this patent is extended or adjusted under 35 U.S.C. 154(b) by 0 days.

(21) Appl. No.: 14/210,077

(22) Filed: Mar. 13, 2014

(65) Prior Publication Data

US 2015/0013537 A1 Jan. 15, 2015

Related U.S. Application Data

(60) Provisional application No. 61/780,264, filed on Mar. 13, 2013.

(51) Int. Cl.
*B01D 53/22* (2006.01)
*C08J 5/00* (2006.01)
*B01D 71/56* (2006.01)
*B01D 71/12* (2006.01)
*B01D 67/00* (2006.01)

(52) U.S. Cl.
CPC .......... *B01D 53/228* (2013.01); *B01D 67/0006* (2013.01); *B01D 71/12* (2013.01); *B01D 71/56* (2013.01); *C08J 5/00* (2013.01); *B01D 2323/26* (2013.01); *C08J 2301/10* (2013.01); *C08J 2377/00* (2013.01)

(58) Field of Classification Search
CPC ...... B01D 53/228; B01D 71/56; B01D 71/12; B01D 67/0006; B01D 2323/26; C08J 5/00; C08J 2301/10; C08J 2377/00

See application file for complete search history.

(56) References Cited

U.S. PATENT DOCUMENTS

| | | | |
|---|---|---|---|
| 3,396,510 A | | 8/1968 | Ward, III et al. |
| 4,532,123 A | * | 7/1985 | Gardner .......................... 424/497 |
| 4,548,196 A | * | 10/1985 | Torobin .......................... 126/654 |

(Continued)

OTHER PUBLICATIONS

Dortmundt, D. and Doshi, K., "Recent Developments in CO2 Removal Membrane Technology" UOP 1999, pp. 1-32, Lecture Presented Mar. 19, 2004.

(Continued)

*Primary Examiner* — Jason M Greene
*Assistant Examiner* — Anthony Shumate
(74) *Attorney, Agent, or Firm* — Mark R. Malek; William A. Harding; Widerman Malek, PL

(57) ABSTRACT

A method for manufacturing an immobilized liquid membrane using a water solution and a hexane solution is provided. The method may include producing a plurality of particles having a distribution of sizes from the water solution, covering the plurality of particles in the hexane solution, creating a plurality of microcapsules each comprising a flexible wall encapsulating a respective one of the plurality of particles, and creating a gap membrane between the plurality of microcapsules, the gap membrane being formed by polymerization reaction between a second portion of the water solution and a second portion of the hexane solution. Each of the plurality of microcapsules and the gap membrane are permeable to a first gas of a mixture of gasses comprising the first gas and a second gas, each of the microcapsules and the gap membrane being substantially impermeable to the second gas.

20 Claims, 5 Drawing Sheets

(56) References Cited

U.S. PATENT DOCUMENTS

| | | | |
|---|---|---|---|
| 4,637,990 A * | 1/1987 | Torobin | 502/10 |
| 4,671,909 A * | 6/1987 | Torobin | 264/43 |
| 4,777,154 A * | 10/1988 | Torobin | 501/84 |
| 4,793,980 A * | 12/1988 | Torobin | 423/213.5 |
| 4,867,931 A * | 9/1989 | Cochran, Jr. | 264/9 |
| 4,942,129 A * | 7/1990 | Goosen et al. | 435/182 |
| 5,212,143 A * | 5/1993 | Torobin | 502/415 |
| 5,766,317 A * | 6/1998 | Cable et al. | 96/10 |
| 6,958,085 B1 | 10/2005 | Parrish | |
| 7,011,776 B2 * | 3/2006 | Suzuki et al. | 264/4.6 |
| 7,122,503 B2 * | 10/2006 | Seehafer et al. | 503/214 |
| 7,323,039 B2 * | 1/2008 | Suzuki et al. | 96/6 |
| 8,673,294 B2 * | 3/2014 | Wang | 424/93.7 |
| 8,945,279 B2 * | 2/2015 | Aines et al. | 95/139 |
| 2003/0094715 A1 * | 5/2003 | Suzuki et al. | 264/4.1 |
| 2005/0204915 A1 * | 9/2005 | Sammons et al. | 95/45 |
| 2006/0096715 A1 * | 5/2006 | Suzuki et al. | 159/31 |
| 2010/0326278 A1 * | 12/2010 | Nakamura et al. | 96/8 |
| 2013/0206316 A1 * | 8/2013 | Liu | 156/62.2 |
| 2015/0009569 A1 * | 1/2015 | Okagaki et al. | 359/599 |

OTHER PUBLICATIONS

Kovvali, A., Chen, H., and Sirkar, K., "Glycerol-based Immobilized Liquid Membranes for Olefin-Paraffin Separation," Ind. Eng. Chem. Res., 41 (3), pp. 347-356, (2002).

Kovvali, A., Chen, H., Obuskovic, G., Majumdar, S., and Sirkar, K., "Immobilized Liquid Membranes for CO2 Separation", Center for Membrane Technologies, Dept. Chemical Engineering, Chemistry and Environmental Science, New Jersey Institute of Technology, Newark, NJ 07102, pp. 665-667, (2006).

Scholes, C. A., Kentish, S. E., and Stevens, G. W., "Carbon Dioxide Separation through Polymeric Membrane System for Flue Gas Application", Recent Patents on Chemical Engineering, 1, pp. 52-66, (2008).

* cited by examiner

MICROENCAPSULATED IMMOBILIZED LIQUID MEMBRANE FOR CARBON DIOXIDE CAPTURE AND ASSOCIATED METHODS

RELATED APPLICATIONS

This application claims the benefit under 35 U.S.C. §119 (e) of U.S. Provisional Patent Application Ser. No. 61/780,264 filed by the inventors of the present application on Mar. 13, 2013 and titled Preparation of a Microencapsulated Immobilized Liquid Membrane for Carbon Dioxide Capture, the entire contents of which are incorporated herein by reference. This application is also related to U.S. Pat. No. 6,958,085 issued Oct. 25, 2005 and titled High Performance Immobilized Liquid Membrane For Carbon Dioxide Separations, the entire contents of which are incorporated herein by reference, except to the extent disclosure therein is inconsistent with disclosure herein.

FIELD OF THE INVENTION

The present invention relates to the field of gas separation and, more specifically, to immobilized liquid membranes for separating gases, and associated methods.

BACKGROUND

Gas separation has been the subject of considerable research for many years. For example, NASA Kennedy Space Center advanced the state of the practice of gas separation to capture and remove carbon dioxide ($CO_2$) from the International Space Station and other space habitats. Gas separation technology also has the potential to greatly reduce the amount of carbon dioxide released into earth's atmosphere by capturing and removing $CO_2$ from combustion processes such as power plant operations. Furthermore, $CO_2$ captured during gas separation has many useful applications, including crude oil recovery, methane and biomass production, and bioregenerative applications.

Polymeric membrane is a commonly employed gas separation technology that is characterized by positioning a selective barrier made of a polymeric material between two fluid phases. Polymeric membranes have enjoyed some commercial successes, even though their selectivity for $CO_2$ over other gases is very low. By way of definition, selectivity is a measure of gas separation efficiency expressed as the ratio of the number of two different molecules permeating a membrane per unit time. For example, if 6000 $CO_2$ molecules and only 1 $N_2$ permeated the membrane per minute, the membrane selectivity would be 6000:1 with respect to these molecules. Over the last decade, the $CO_2$ reduction efficiency demonstrated by 80 large-scale polymeric membrane units installed worldwide has averaged only 25 percent of the initial quantity present in the feed. These large scale commercial systems use polymeric membranes including polyamides to capture or reduce $CO_2$.

Immobilized liquid membrane (ILM) is a type of facilitated transport membrane (FTM) that features a liquid solution immobilized in the pores of a polymeric or ceramic substrate by physical forces. The liquid solution typically consists of a carrier and a solvent. The carrier reacts reversibly with certain gas species such that gas molecules of interest are allowed to permeate the carrier while other gas molecules are not allowed to permeate the carrier.

Compared to conventional polymeric membranes, ILMs have the potential to provide higher gas fluxes and improved selectivities for reacting gas species such as carbon dioxide and olefins, particularly at low concentrations in gas separation. As a point of reference, U.S. Pat. No. 3,396,510 to Ward discloses achievement of selectivity ratios for $CO_2/O_2$ of 1100:1. During the subsequent decades, work on immobilized membranes has continued with measured $CO_2$ permeability over $N_2$ and CO in the laboratory in excess of 6000:1.

Despite the advantages offered by the immobilized liquid membranes, commercialization of these membranes has been hampered by the inherent limitation of stability of the liquid membranes. For example, the volatility of conventional immobilized liquids results in their tendency to evaporate when confronted by long-term exposure to the vacuum of space. Consequently, immobilized liquids generally cannot be utilized as an interface between, for example, an extravehicular mobility unit (EMU) and space. Similarly, applications such as removal of carbon dioxide from the flue gas of coal-fired power plants tend to volatilize immobilized liquids. The main design challenges contributing to the instability of ILMs lack of chemical bonding of the liquid to the supporting membrane, evaporation of the liquid, and the limited differential pressure the membranes could tolerate.

Typically, immobilized liquid membranes that rely only on support pores for strength suffer from two major problems: (1) the liquid evaporates during prolonged exposure to gaseous mixtures and (2) the liquid is only trapped in the matrix of the supporting media and can only withstand very small differential pressures. Unfortunately, factors that allow higher differential pressures (specifically, smaller pore diameter and longer path) also tend to decrease the selected gas permeation rate. Because of these problems, immobilized liquid membranes have found limited use and commercial availability. However, the gas separation industry is experiencing advancements in designs to stabilize immobilized liquid membranes, some of which may be pertinent to certain aspects of manufacturing and implementing ILM-based gas separation solutions.

U.S. Pat. No. 6,958,085 to Parrish discloses a design to overcome the membrane stability problem, which includes microencapsulation of the immobilized liquid in a gas permeable polymer, followed by dispersion of the microcapsules on the surface of a gas permeable support membrane. However, although the membrane proved to be physically strong, the initial systems could not overcome problems associated with leakage around the microcapsules.

ILM stabilization and liquid leakage are both impacted by the type of polymeric wall material used to contain the immobilized liquids. In a study by Scholes, $CO_2$ separations from $N_2$, $O_2$ and $H_2O$ using polymeric membranes which were generally nonporous and which follow the solution-diffusion permeation mechanism were reviewed (See Scholes, C. A., Kentish, S. E., and Stevens, G. W., *Carbon Dioxide Separation through Polymeric Membrane System for Flue Gas Application*, Recent Patents on Chemical Engineering, 2008, 1, 52-66). The solution-diffusion mechanism was based on the solubility of the specific gas and its diffusion through the dense membrane matrix. In this case, the physical-chemical interaction of a gas with the polymer matrix determines its concentration in the membrane, which is directly proportional to the permeability coefficient. The other important factor is the diffusion coefficient which describes the mobility of the gas in the polymer membrane. If follows that, for microencapsulation of the immobilized liquid, the type of microcapsule wall material and its thickness are critical factors. The permeability of gases through the immobilized liquid is primarily solubility dependent, which is a fact that has been established by earlier immobilized liquid membrane development.

Scholes reported that much work has been done in an attempt to produce efficient membranes to remove carbon dioxide from natural gas for the utility industries, leading to commercial uses of polymeric membranes that include cellulose acetate, polyimides, polyamides, polysulfones, polycarbonates, and polyetherimides. Dortmundt also reported that the commercially viable membranes for $CO_2$ removal are polymer based, and his examples were the same as those reported by Scholes (See Dortmundt, D. and Doshi, K., *Recent Developments in CO2 Removal Membrane Technology*, UOP 1999, Lecture Presented Mar. 19, 2004). Dortmundt also confirmed that Fick's Law, shown as follows, is widely used to approximate the solution-diffusion permeation process:

$$J = \frac{k \times D \times \Delta \rho}{l}$$

where:

J is the membrane flux of CO2 through the membrane per unit area

K is the solubility of CO2 in the membrane

D is the diffusion coefficient of CO2 through the membrane

Δp is the partial pressure difference of CO2 between the feed (high pressure) and permeate (low pressure) sides of the membrane l is the membrane thickness Note: The diffusion coefficient and solubility are often combined and called permeability (P).

Currently employed polymeric membranes require higher pressures to achieve separation of gases. For example, Scholes reported pressures in the range of 60 psi (110 kPa) were used to force $CO_2$ through the polyvinyl acetate membranes with a permeability of 3.1, while cellulose acetate wet with 2N $KHCO_3$ and 0.5 N $NaAsO_2$ had a permeability of 2000 barrier at a pressure of 0.5 psi (4 kPa). The cellulose acetate wet with 2N $KHCO_3$ and 0.5 N $NaAsO_2$ is an example of an immobilized liquid which would not be stable due to water evaporation. As a point of reference, flue gas from a typical coal-fired power plant is very sensitive to a few (2 to 3) inches of water back-pressure, and 0.5 psi is equivalent of about 16 inches of water. Values for polymeric membranes of 60 psi to achieve only a 3.1 barrier would be totally unacceptable for high gas flow applications such as power plant flue gas where gas compression would be totally impractical due the large gas volume. Instead, the design of a membrane system for coal-fired power plants must operate with minimal back pressure (for example, 2 to 3 inches of water).

The natural gas industry primarily uses solvent extraction processes to achieve gas separation. Referring to FIG. 5, the amine scrubber system 500 may pass all of the flue gas 410 through the scrubber 510 where the scrubber liquor 530 may absorb the $CO_2$. The absorption process is a neutralization reaction, which is exothermic and requires a cooler 520 to keep the temperature low for efficient capture. The scrubber liquor 530 may pass to the recycle unit where heat 540 and/or reduced pressure are used to remove the $CO_2$ and return it to the scrubber 510. There is some degradation of the ethanol amine that must be disposed of as waste 550.

For the reasons stated above, and for other reasons stated below which will become apparent to those skilled in the art upon reading and understanding the present specification, there is a need in the art for gas separation alternatives, and particularly as applied to carbon dioxide removal.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, the present invention is directed to a an immobilized liquid membrane and a method for manufacturing an immobilized liquid membrane that advantageously provides a solution to gas separation efficiency with respect to CO2. It is further an object of the present invention to provide an immobilized liquid membrane and a method for manufacturing an immobilized liquid membrane that is stable, and has decreased volatility. It is also an object of the present invention to provide an immobilized liquid membrane and a method of manufacturing an immobilized liquid membrane that provides enhanced chemical bonding of the liquid to the supporting membrane. The immobilized liquid membrane and method of manufacturing the same according to embodiments of the present invention also advantageously overcome problems associated with leakage around microcapsules.

These and other features and advantages according to embodiments of the present invention are provided by a method of manufacturing an immobilized liquid membrane that includes using a water solution and a hexane solution. The method may include producing, using a first portion of the water solution, a plurality of particles having a distribution of sizes. The method may further include covering the plurality of particles in a first portion of the hexane solution, wherein the water solution and the hexane solution are immiscible.

The method, according to embodiments of the present invention, may also include creating a plurality of microcapsules each comprising a flexible wall encapsulating a respective one of the plurality of particles. Each flexible wall may be formed by polymerization reaction between the respective particle and the first portion of the hexane solution. The method according to embodiments of the present invention may still further include creating a gap membrane between the plurality of microcapsules. The gap membrane may be formed by polymerization reaction between a second portion of the water solution and a second portion of the hexane solution. Each of the plurality of microcapsules and the gap membrane may be permeable to a first gas of a mixture of gasses comprising the first gas and a second gas, each of the microcapsules and the gap membrane being substantially impermeable to the second gas.

The water solution may comprise about 2-wt % sodium carboxylmethyl cellulose that is 0.5 M in hexamethylene diamine and sodium hydroxide. In some embodiments, the hexane solution may comprise a 0.2 M solution of sebacoyl chloride in hexane. The step of creating the plurality of microcapsules may also include creating at least one of the microcapsules to comprise 2-wt % sodium carboxylmethyl cellulose, 5.8-wt % unreacted hexamethylene diamine, and 2-wt % sodium hydroxide for total solids of 9.8-wt % in water. The plurality of particles may, for example, be produced using a paint-type sprayer.

In other embodiments of the invention, the step of creating the plurality of microcapsules may also comprise creating the flexible walls to comprise a polyamide. Covering the plurality of microspheres in the first portion of the hexane solution may also include settling the microspheres into the hexane solution. The water solution may be characterized by a first density, and the hexane solution may be characterized by a second density that is less than the first density. The method according to embodiments of the present invention may also include the step of disposing the plurality of microcapsules atop a supporting membrane.

Creating the gap membrane between the plurality of microcapsules may also include saturating the supporting membrane with the second portion of the hexane solution, and applying the second portion of the water solution atop the separator film. In some embodiments, the first gas may carbon dioxide, and the second gas may, for example, be oxygen, nitrogen, and/or carbon monoxide.

Embodiments of the present invention are also directed to an immobilized liquid membrane that may include a plurality of microcapsules each comprising a flexible wall encapsulating a respective one of the plurality of particles. The immobilized liquid membrane according to embodiments of the present invention may also include a gap membrane between the plurality of microcapsules. Each of the plurality of microcapsules and the gap membrane may be permeable to a first gas of a mixture of gasses comprising the first gas and a second gas. Each of the microcapsules and the gap membrane may be substantially impermeable to the second gas.

DETAILED DESCRIPTION OF THE INVENTION

Figure 1:
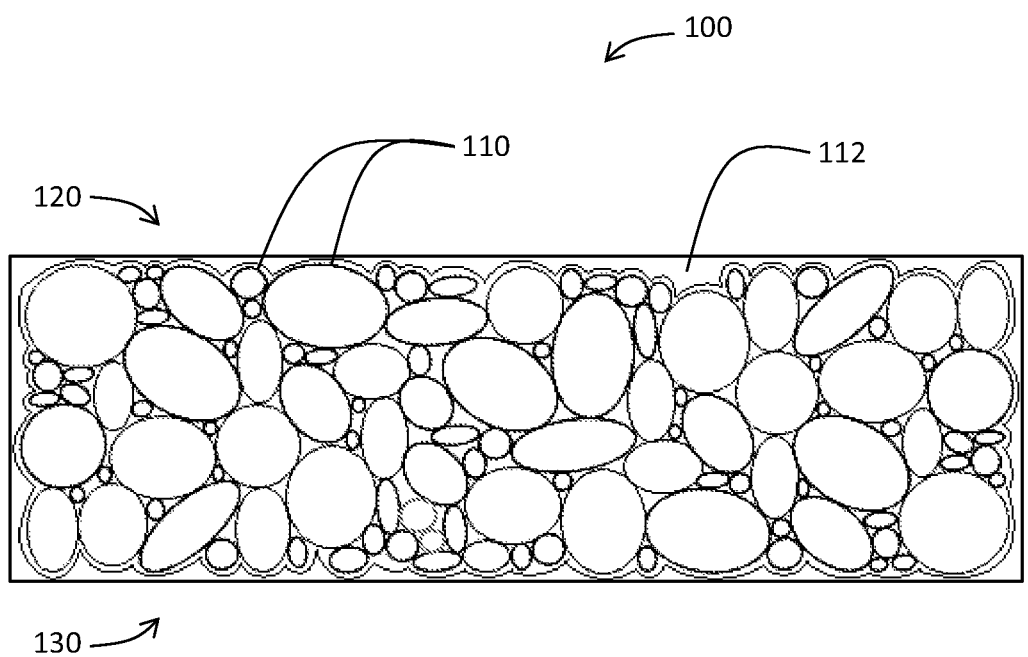
FIG. 1 is a schematic illustrating an immobilized liquid membrane according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention text, as shown and described by the various figures and accompanying text, provides an immobilized liquid membrane according to an embodiment of the present invention. Throughout this disclosure, the present invention may be referred to as an immobilized liquid membrane system, a membrane, a system, a gas separation device, a separator, a carbon separator, a device, a product, and a method. Those skilled in the art will appreciate that this terminology is only illustrative and does not affect the scope of the invention. Like numbers refer to like elements throughout.

Example methods and systems for an immobilized liquid membrane are described herein below. In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not limitation.

Some of the illustrative aspects of the present invention may be advantageous in solving the problems herein described and other problems not discussed which are discoverable by a skilled artisan.

Referring now to FIGS. 1 through 6, an immobilized liquid membrane (ILM) 100 according to an embodiment of the invention will now be discussed. In various implementations, the immobilized liquid membrane 100 shown separately in FIGS. 1 and 3 may be used alone or together with other similar ILM assemblies in a system of ILM assemblies. Referring more specifically to FIG. 1, the immobilized liquid membrane 100 may include a plurality of microcapsules 110 chemically bonded with each other and/or with a gap membrane 112, where the gap membrane 112 may provide a fluid-tight seal between a top surface 120 and a bottom surface 130 of the ILM 100. For example, and without limitation, microcapsules 110 may be characterized by a flexible structure and may exhibit a large range of shapes and sizes. These features may contribute to formation of immobilized liquid membranes 100 that advantageously limit fluid leakage around the microcapsules 110 from the top surface 120 to the bottom surface 130.

Figure 2:
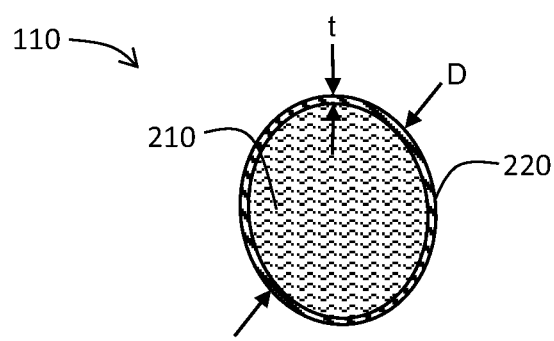
FIG. 2 is an enlarged cross-sectional view of a microcapsule of the immobilized liquid membrane of FIG. 1.

Continuing to refer to FIG. 1, and referring additionally to FIG. 2, microcapsule 110 may encapsulate a gel 210 that may be selectively permeable to a gas, such as carbon dioxide ($CO_2$), that may be selected for separation from one or more other gasses, such as oxygen, carbon monoxide, and nitrogen.

Specifically, the gel 210 may be permeable to the gas that is to be separated from the one or more other gasses, but substantially impermeable to the other gasses. For example, and without limitation, for separating carbon dioxide from at least one of oxygen, carbon monoxide, and nitrogen, gel 210 may be an alkaline fluid like sodium glycinate in water, which readily dissolves $CO_2$ but is a non-solvent for $N_2$ or $O_2$.

Microcapsule 210 may include a flexible wall (or shell) 220 that may surround gel 210. The material of the flexible wall 220, similar to the gel 210, may be permeable to the gas that is to be separated from the one or more other gasses, but substantially impermeable to the other gasses. Flexible wall 220 may act to reduce evaporation of gel 210, so that gel 210 may be either a volatile or a substantially nonvolatile liquid.

Figure 3:
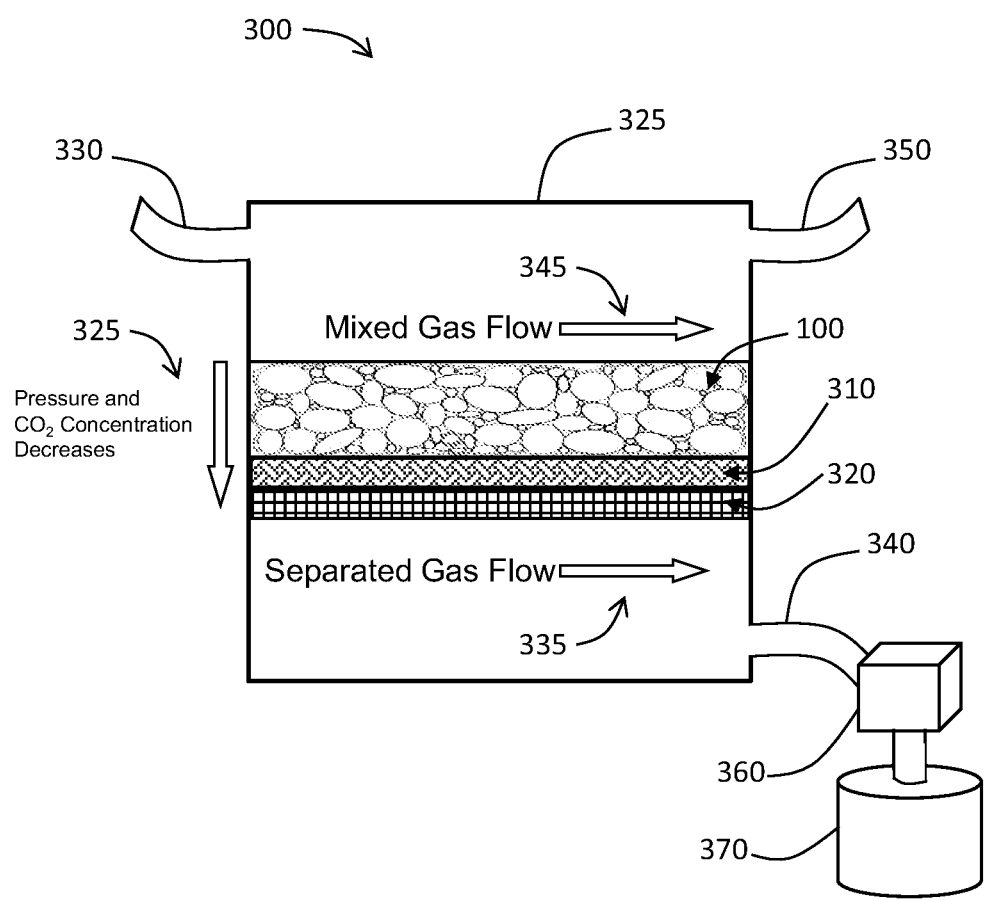
FIG. 3 is a schematic illustrating a method of operating a gas separation system using an immobilized liquid membrane according to an embodiment of the present invention.

Referring now to FIG. 3, a gas separation system 300 employing an immobilized liquid membrane (ILM) 100 according to an embodiment of the invention will now be discussed. For example, and without limitation, the ILM 100 may be positioned adjacent to and/or in mechanical contact with a supporting membrane 310. For example, and without limitation, the supporting membrane 310 may comprise a polymeric fiber. Also for example, and without limitation, the supporting membrane 310 may be positioned adjacent to and/or in mechanical contact with a supporting screen 320, which may comprise a metal mesh.

The ILM 100 may be positioned within an enclosure 325 that may be configured to transport separated gases through a plurality of flow channels 335, 345. The enclosure may include a mixed gas inlet 330, a separated gas outlet 340, and an exhaust 350. For example, and without limitation, FIG. 3 graphically illustrates separation of a gas 335, such as $CO_2$, from the gas mixture 345 by reducing pressure 325 using a negative pressure generating device, such as a compressor 360, that may otherwise be employed to transport the separated gas to a storage 370 or downstream pipeline. Advantageously, the only energy expended in the illustrated process is the same energy used by other methods to transport the separated gas.

In one embodiment, FIG. 3 illustrates a conceptual design of the gas separation system 300 that may be configured to separate $CO_2$ from $N_2$ and/or $O_2$. Concentration gradients across the walls 220 and the immobilized gels 210 in the microcapsules 110 may establish a flow direction 325 from high concentration to low concentration. When a gas mixture 345 that contains $CO_2$, $N_2$, and $O_2$ is passed over the top surface 120 of the ILM 100, $CO_2$ may permeate through the flexible walls 220 of the microcapsules 110 and dissolve in the immobilized gels 210 of the microcapsules 110. Since the compressor 360 may lower the concentration of $CO_2$ in the channel 335 positioned below the bottom surface 130 of the ILM 100, the $CO_2$ may permeate through the ILM 100. Inside the involved microcapsules 110, when the $CO_2$ permeates through the respective flexible wall 220, another concentration gradient may exist across the immobilized gel 210 in a particular microcapsule 110 and the $CO_2$ may flow across the gel 210 in the microcapsule 110. FIG. 3 illustrates this type of flow 335 of $CO_2$. For example, and without limitation, the lowest concentration of $CO_2$ may be at the suction side of the separated gas channel 335 nearest the separated gas outlet 340 and the highest concentration of $CO_2$ may be in the mixed gas 345 above the top surface 120 of the ILM 100. Thereby, this design may establish a flow of $CO_2$ from the mixed gas 345 to the suction side of the enclosure 325 nearest the compressor 360.

Continuing to refer to FIG. 3, a method aspect of operating the gas separation system 300 may include creating a differential pressure 325 below the ILM 100 of approximately 5 psi by reducing the pressure on the permeate side 335 with the compressor 360 that may compress the permeated $CO_2$ 335. This system 300 configuration with a compressor 360 would have no direct impact on pressure applied to the microcapsules 110 of the ILM 100, but would create a significant differential pressure in the channel 335 below the ILM 100.

Figure 4:
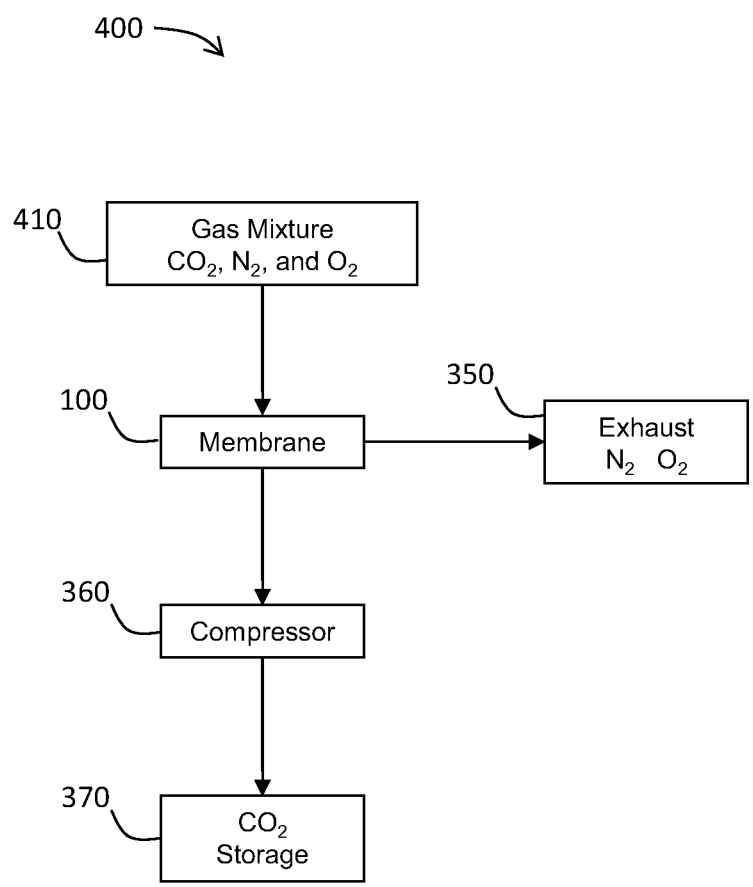
FIG. 4 is a schematic illustrating a gas separation system using an immobilized liquid membrane according to an embodiment of the present invention.
Figure 5:
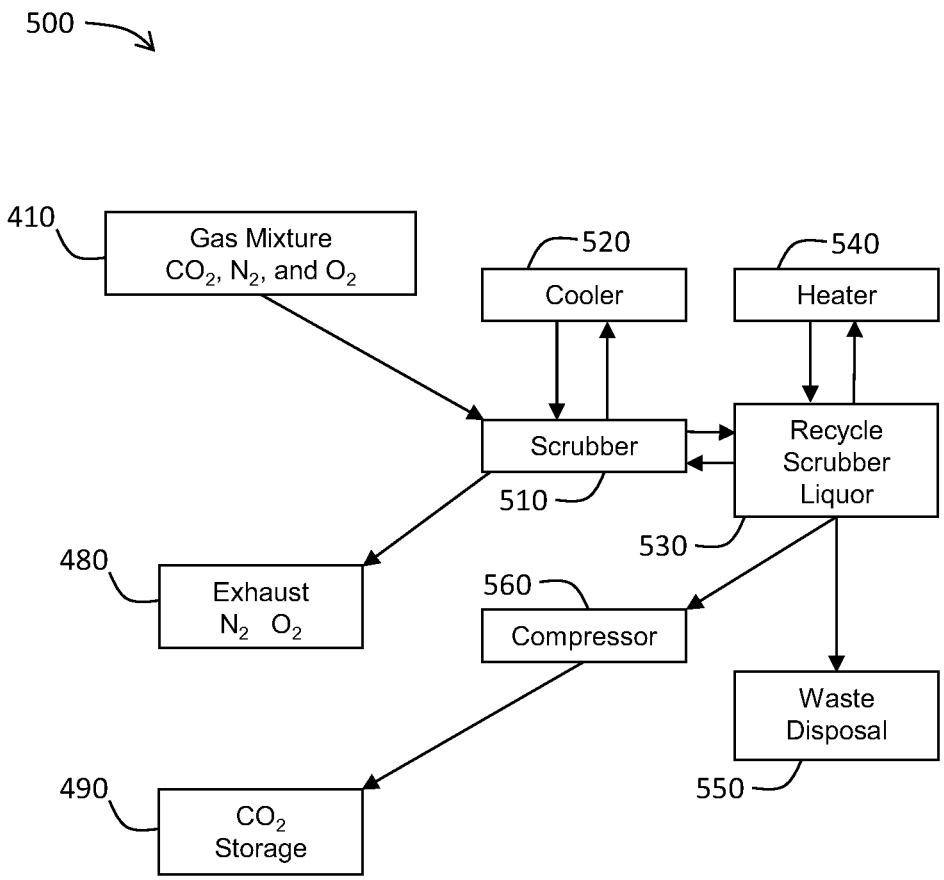
FIG. 5 is a schematic illustrating an exemplary gas separation technology known in the prior art.

Referring now to FIG. 4, a system interaction aspect for capturing $CO_2$ from a gas mixture using an immobilized liquid membrane (ILM) 100 according to an embodiment of the invention will now be discussed. For example, and without limitation, a gas mixture 410 that contains $CO_2$, $N_2$, and $O_2$ may be supplied. The gas mixture 410 may pass over the top surface 120 of the ILM 100, and $CO_2$, which is soluble in the immobilized liquid membrane 100, may pass through the membrane 100 by the differential pressure. The suction side of the compressor 360 may continually lower the partial pressure of $CO_2$ on the permeate side 130 of the membrane 100 and the compressor 360 may transfer the $CO_2$ to a pipeline or similar storage 370. The remainder of the flue gas (that is, $N_2$ and $O_2$) minus $CO_2$ may be passed to the exhaust stack 350. The difference between the gas separation process 400 and a solvent scrubber capture process known in the prior art is illustrated with reference to FIG. 5. The difference between the two systems is very apparent. The membrane system 300 only uses a compressor 560 to permeate the $CO_2$, while the amine system 500 has the added cost of recycling the amine solution to separate the $CO_2$.

Figure 6:
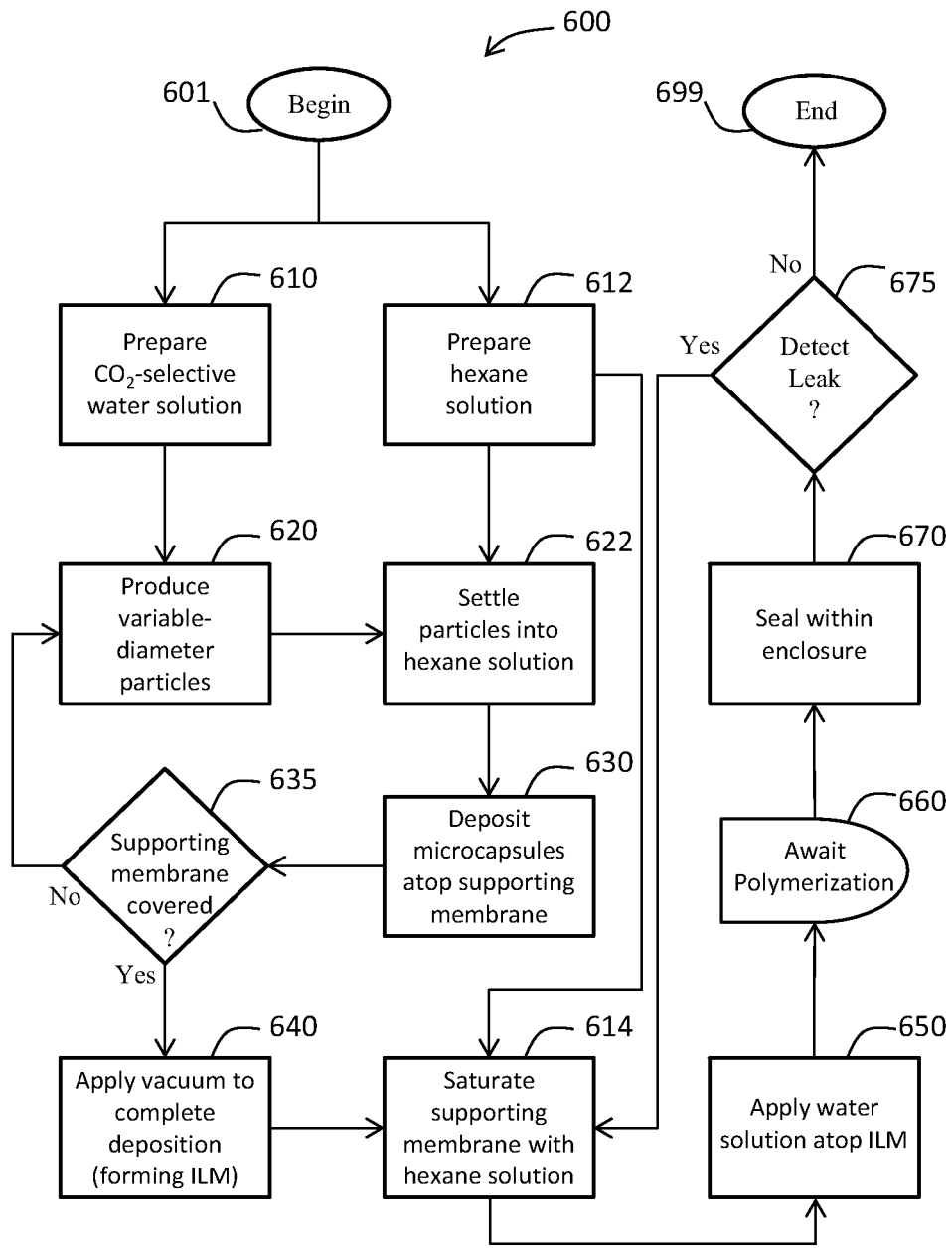
FIG. 6 is a flowchart of a method for making an immobilized liquid membrane according to an embodiment of the present invention.

Referring now to FIG. 6, a method of manufacturing an immobilized liquid membrane (ILM) 100 according to an embodiment of the invention will now be discussed. For example, and without limitation, process 600 may use proven methods to encapsulate the immobilized gel 210 within the flexible wall material 220 to create a microcapsule 110 that may be capable of permeating $CO_2$ while rejecting other gases like $N_2$ and $O_2$. For example, and without limitation, the method 600 may including forming very thin coating of a polyamide 220 around the immobilized gel 210 to produce a flexible microcapsule 100. Since the microcapsules 100 may be small, so would be the thickness of the wall material 220, which in this case would be a polyamide. As described above in Fick's Law, the permeation rate is inversely proportional to the polymer wall thickness. If the wall was just 1 percent the thickness of the polymer membrane found in commercial polymer membranes, the flux would be 100 times greater for the microencapsulated membrane. Diffusion through liquids is many times faster than through solids, which means the liquid phase adds little to the permeation time.

The Nylon synthesis may also used to illustrate interfacial polymerizations where the reaction occurs at the interface between two immiscible liquids. These reactions are also examples of condensation polymerizations, where small molecules are eliminated to complete coupling the reaction components. The two equations given below illustrate the principle reactions that are responsible for forming a polyamide. As can be seen below the product of the first reaction is still capable of adding to each end, which is termed the propagation reaction.

Cl—CO—(CH2)6-CO—Cl+NH2-(CH2)6-NH2→Cl—CO—(CH2)6-CO—NH—(CH2)6-NH2+HCl HCl+NaOH→NaCl+HOH

The first reaction of sebacoyl chloride with hexamethylene diamine shows the elimination of the Cl and H to form HCl (hydrochloric acid), which reacts (second reaction) with NaOH (sodium hydroxide) to form NaCl (salt) and HOH (water). These reactions are very fast and would create the wall material 220 for the immobilized gel 210.

For example, and without limitation, formation of flexible microcapsules 110 using the immiscible liquids described above presumes the immobilized gel 210 comprises micro-gel particles (sometimes referred to as microspheres).

The following features are advantageous to production of a membrane 100 that may only permit gases of interest to pass through the ILM 100: First, a wide range of microcapsule 110 sizes may improve packing of those microcapsules 100 in the ILM 100 by filling gaps between adjacent flexible microcapsules 110. Second, the same polymerization reactions used to form the flexible walls 220 of the flexible microcapsules 110 may be used to form a gap membrane 112 of nylon across any remaining gaps within the membrane 100. For example, and without limitation, the flexible nylon membrane 112 may be created by the reaction of alkaline hexamethylene diamine (that may pass between micro-gel particles 210) with the hexane solution of sebacoyl chloride.

Continuing to refer to FIG. 6, the membrane 100 manufacturing process may be divided into three steps to prepare the solutions to form the membrane 100 on the surface of a hydrophilic microporous supporting membrane 310 as illustrated in FIG. 3. The same approach may be used to produce laboratory prototypes, or slightly modified for to produce larger scale membrane filters.

From the beginning at Block 601, the first step may be to prepare two solutions that are immiscible and contain one of the components needed for an interfacial polymerization reaction. For example, and without limitation, one of these solutions may be a weak gel that may be sprayed with an airless paint sprayer. More specifically, at Block 610, the process may involve preparing a ~2-wt % water solution of sodium carboxylmethyl cellulose that is 0.5 M in hexamethylene diamine and sodium hydroxide. At Block 612, the process may involve preparing a 0.2 M solution of sebacoyl chloride in hexane. It is contemplated and included within the scope of the invention that either or each of the water solution and the hexane solution may be pre-prepared, and such a preparation step may be omitted from the method. Portions of these two solutions may be used at Blocks 620 and 622 to form the microcapsules 110, and then again at Blocks 614 and 650 to provide a final seal of any gaps that might remain after Blocks 630 and 640 where the microcapsules 110 may be deposited on a top surface of a supporting membrane 310.

At Block 620, the solutions prepared in Blocks 610 and 612 may be used to produce flexible microcapsules that contain 2-wt % sodium carboxylmethyl cellulose, 5.8-wt % unreacted hexamethylene diamine, and 2-wt % sodium hydroxide for total solids of 9.8-wt % in water. This alkaline solution of the diamine and sodium hydroxide may be adequate to provide high selectivity of $CO_2$ over $N_2$ and $O_2$. Since the micro-gel particles 210 may be formed from a water solution (at Block 610), the density of these particles 210 is greater than the density of the hexane solution of hexamethylene diamine (from Block 612). When, at Block 622, the higher density micro-gel particles may be allowed to settle into the hexane solution of sebacoyl chloride, an exterior surface of the particle 210 may be coated with the polyamide, Nylon 66. This surface reaction may continue as additional particles 210 settle (at Block 622) until the diamine can no longer reach the outer surfaces of the particles 210.

For example, and without limitation, generating particles 210 with a paint type sprayer may produce a wide distribution of particle sizes. Sprayer flow adjustment may control the sizes of the micro-gel particles 210 needed to seal the ILM 100 when stacked. At Block 622, such wide distribution in size advantageously impacts settling rates, which are slower for the smaller particles 210. As a result of the varying settling rates, the larger flexible particles 210 may deposit on the supporting membrane 310 first followed by increasingly smaller particles 210, thus advantageously filling gaps between adjacent particles 210. The hexane solution may be continuously stirred while the diamine solution is sprayed. Then, at Block 622, the stirring may be stopped and the coated particles may be allowed to settle. Once the supporting membrane 310 is covered (Block 635), a slight vacuum may be pulled on the membrane 100 to finish the deposition process (Block 640). The hydrophilic nature of the material in the microcapsules may maintain the water concentration in the micro-gel particles 210 and may prevent the microcapsules 110 from drying out.

Continuing to refer to FIG. 6, the solutions prepared for the manufacturing of the microcapsules 110 in Blocks 610 and 612 may be used to form a final seal of the ILM 100 so as to prevent leakage around any of the micro-gel particles 210 in the microcapsules 110. For example, and without limitation, one embodiment of a sealing operation may comprise saturating a piece of the supporting membrane 310 with the hexane solution of sebacoyl chloride (Block 614). Positioning the freshly prepared ILM 100 containing the microcapsules 110 on top of the supporting membrane 310 that is saturated with the hexane solution (shown at Block 650) may transfer the sebacoyl chloride solution between the supporting membrane 310 and the freshly prepared ILM 100 through the bottom surface 130 of the ILM 100. At Block 660, spraying a fine layer of the water solution of hexamethylene diamine over the top surface 120 of the ILM may allow any gaps between the microcapsules 110 to fill with Nylon (Block 660), thus preparing the above-listed components to be placed into a sealed enclosure (Block 670) to form a complete gas separation system 300. At Block 675, the ILM 100 (and, optionally, the gas separation system 300) may be tested by pressurizing the ILM 100 in a supporting membrane 310 and measuring any leak rate. If a leak is detected at Block 675, this sealing process may be repeated starting at Block 614.

An alternate approach to overcome this leakage problem around the microcapsules 110 may be based on alginate salts to form the flexible walls 220. Microencapsulation methods that use alginate salts are common in the medical field where time-release pharmaceuticals are prepared. In these medical applications, sodium alginate solutions that contain the desired pharmaceutical are dripped as micro-droplets into a calcium chloride solution. The water soluble surface sodium ions exchange with the calcium ion to form a water insoluble calcium alginate shell around the sodium alginate solution droplet. The resulting calcium alginate capsule walls can be very flexible and they can permeate carbon dioxide. As a result of the flexibility of the walls, leakage around the microcapsules may be greatly reduced. However, if there still is a very small leakage around the capsules, a method similar to that illustrated in FIG. 6 may be applied to plug the leakage.

The performance of an ILM 100 manufactured as described above may be tested by measuring selectivity for $CO_2$ over $N_2$ and $O_2$ using mixtures of the three gases. In one embodiment, gas chromatography may be applied whereby gas mixtures may be passed across the membrane 100 at different pressures. Analysis of the permeate for the composition of the permeating gases as compared with the initial gas composition may provide the data needed to calculate permeability for each gas. In an alternative embodiment, performance information may be obtained by using flow meters, pressure gages, and samples of pure gases. For example, a first step may be to setup the pure gases and measure the amount of gas that permeates through the membrane as a function of pressure. A next step may be to prepare mixtures of the three gases and examine how the mixed gas flows compare with the individual flow rates.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A method for manufacturing an immobilized liquid membrane using a water solution and a hexane solution, the method comprising:
   producing, using a first portion of the water solution, a plurality of particles having a distribution of sizes;
   covering the plurality of particles in a first portion of the hexane solution, wherein the water solution and the hexane solution are immiscible;
   creating a plurality of microcapsules each comprising a flexible wall encapsulating a respective one of the plurality of particles, wherein each flexible wall comprises a polyamide formed by polymerization reaction between the respective particle and the first portion of the hexane solution; and
   creating a gap membrane between the plurality of microcapsules, wherein the gap membrane is formed by polymerization reaction between a second portion of the water solution and a second portion of the hexane solution;
   wherein each of the plurality of microcapsules and the gap membrane are permeable to a first gas of a mixture of gasses comprising the first gas and a second gas, each of the microcapsules and the gap membrane being substantially impermeable to the second gas.

2. The method according to claim 1 wherein the water solution comprises ~2-wt % sodium carboxylmethyl cellulose that is 0.5 M in hexamethylene diamine and sodium hydroxide.

3. The method according to claim 1 wherein the hexane solution comprises a 0.2 M solution of sebacoyl chloride in hexane.

4. The method according to claim 1 wherein creating the plurality of microcapsules further comprises creating at least one of the microcapsules to comprise 2-wt % sodium carboxylmethyl cellulose, 5.8-wt % unreacted hexamethylene diamine, and 2-wt % sodium hydroxide for total solids of 9.8-wt % in water.

5. The method according to claim 1 wherein the plurality of particles are produced using a sprayer.

6. The method according to claim 1 wherein creating the plurality of microcapsules further comprises creating the flexible walls to comprise a polyamide.

7. The method according to claim 1 wherein covering the plurality of microspheres in the first portion of the hexane solution further comprises settling the microspheres into the hexane solution; wherein the water solution is characterized by a first density; and wherein the hexane solution is characterized by a second density that is less than the first density.

8. The method according to claim 1 further comprising the step of disposing the plurality of microcapsules atop a supporting membrane.

9. The method according to claim 8 wherein creating the gap membrane between the plurality of microcapsules further comprises:
   saturating the supporting membrane with the second portion of the hexane solution; and
   applying the second portion of the water solution atop the plurality of microcapsules.

10. The method according to claim 1 wherein the first gas is carbon dioxide.

11. The method according to claim 1 wherein the second gas is at least one of oxygen, nitrogen, and carbon monoxide.

12. A method for separating carbon dioxide from a gas mixture including a first gas using a negative pressure-generating device and an immobilized liquid membrane having a first surface and a second surface opposite the first surface, the method comprising:
   contacting the gas mixture with the first surface of an immobilized liquid membrane comprising a plurality of microcapsules each comprising a flexible wall encapsulating a respective one of a plurality of particles, and a gap membrane positioned between the plurality of microcapsules, wherein the plurality of microcapsules and the gap membrane each comprise a polyamide that is permeable to the first gas and are substantially impermeable to a second gas;
   creating negative pressure along the second surface of the immobilized liquid membrane using the negative pressure-generating device; and
   separating a quantity of the first gas from the gas mixture by drawing the quantity of first gas through the immobilized liquid membrane using the negative pressure.

13. The method according to claim 12 wherein each of the plurality of microcapsules comprise 2-wt % sodium carboxylmethyl cellulose, 5.8-wt % unreacted hexamethylene diamine, and 2-wt % sodium hydroxide for total solids of 9.8-wt % in water.

14. The method according to claim 12 wherein at least one of the microcapsules comprises 2-wt % sodium carboxylmethyl cellulose, 5.8-wt % unreacted hexamethylene diamine, and 2-wt % sodium hydroxide for total solids of 9.8-wt % in water.

15. An immobilized liquid membrane comprising:
   a plurality of microcapsules each comprising a flexible wall encapsulating a respective one of a plurality of particles; and
   a gap membrane between the plurality of microcapsules;

wherein each of the plurality of microcapsules and the gap membrane comprise a polyamide that is permeable to a first gas of a mixture of gasses comprising the first gas and a second gas, each of the microcapsules and the gap membrane are substantially impermeable to the second gas.

16. The immobilized liquid membrane of claim 15 wherein the flexible walls comprise a polyamide.

17. The immobilized liquid membrane of claim 15 wherein the plurality of particles comprises particles having a distribution of sizes.

18. The immobilized liquid membrane of claim 15 wherein at least one of the microcapsules comprises 2-wt % sodium carboxylmethyl cellulose, 5.8-wt % unreacted hexamethylene diamine, and 2-wt % sodium hydroxide for total solids of 9.8-wt % in water.

19. The immobilized liquid membrane of claim 15 wherein the first gas is carbon dioxide.

20. The immobilized liquid membrane of claim 19 wherein the second gas is at least one of oxygen, nitrogen, and carbon monoxide.

\* \* \* \* \*